US006978439B2

(12) United States Patent
Kelley et al.

(10) Patent No.: US 6,978,439 B2
(45) Date of Patent: Dec. 20, 2005

(54) CROSS-PLATFORM SOFTWARE DEVELOPMENT WITH A SOFTWARE DEVELOPMENT PERIPHERAL

(75) Inventors: David Kelley, Woodinville, WA (US); Larry Morris, Kirkland, WA (US); Sridhar S. Mandyam, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 10/044,505

(22) Filed: Jan. 10, 2002

(65) Prior Publication Data

US 2003/0131148 A1 Jul. 10, 2003

(51) Int. Cl.[7] .................................................. G06F 9/44
(52) U.S. Cl. ....................... 717/101; 717/120; 717/174
(58) Field of Search .............................. 717/101–103, 717/120, 121, 124, 127, 174–178

(56) References Cited

U.S. PATENT DOCUMENTS

| | | | | |
|---|---|---|---|---|
| 5,581,740 | A | * | 12/1996 | Jones ........................... 703/25 |
| 5,604,906 | A | * | 2/1997 | Murphy et al. .............. 717/162 |
| 5,666,334 | A | * | 9/1997 | Tokuyama et al. ............ 369/14 |
| 5,794,052 | A | * | 8/1998 | Harding ....................... 717/178 |
| 5,937,189 | A | * | 8/1999 | Branson et al. ............. 717/101 |
| 6,080,207 | A | * | 6/2000 | Kroening et al. ........... 717/172 |
| 6,247,140 | B1 | * | 6/2001 | Chase-Salerno et al. ........ 714/2 |
| 6,253,209 | B1 | * | 6/2001 | Chase-Salerno et al. . 707/104.1 |
| 6,536,037 | B1 | * | 3/2003 | Guheen et al. .............. 717/151 |
| 6,640,278 | B1 | * | 10/2003 | Nolan et al. .................... 711/6 |
| 6,718,436 | B2 | * | 4/2004 | Kim et al. ................... 711/114 |
| 6,721,713 | B1 | * | 4/2004 | Guheen et al. ................ 705/1 |
| 6,772,192 | B1 | * | 8/2004 | Fulton et al. ............... 709/203 |
| 6,775,830 | B1 | * | 8/2004 | Matsunami et al. ......... 717/176 |
| 6,845,466 | B2 | * | 1/2005 | Gold ............................. 714/7 |

OTHER PUBLICATIONS

Morsiani et al, "Learning operating systems structure and implemenation through the MPS computer systems Simulator", ACM SIGCSE, pp 63-67, 1999.*
Anderson et al, "The interaction of architecture and operating system design", ACM pp 108-120, 1991.*
Ionescu, "Application level virtual memeory management in real time multiprocessor systems", ACM SAC, pp 610-685, 2000.*
Gauthier et al, "Automatic generation and targeting of application specific operating systems and embaded system software", IEEE, pp 679-685, 2001.*

* cited by examiner

Primary Examiner—Anil Khatri
(74) Attorney, Agent, or Firm—Lee & Hayes, PLLC

(57) ABSTRACT

A cross-platform development system includes a computing device that generates an image of an operating system, and a software development peripheral connected to the computing device that runs the operating system corresponding to the image. The software development peripheral communicates information, such as image data, generated by the operating system back to the computing device where the information is displayed on a display device connected to the computing device.

27 Claims, 7 Drawing Sheets

CROSS-PLATFORM SOFTWARE DEVELOPMENT WITH A SOFTWARE DEVELOPMENT PERIPHERAL

TECHNICAL FIELD

This invention relates to software development and, in particular, to cross-platform development of software applications and operating systems with a software development peripheral device.

BACKGROUND

Cross-platform development involves developing software, such as operating systems or application programs, such that the software operates with computers having different central processing units (CPUs) from one central processor unit type to another. Cross-platform development is typically accomplished by using a computer system to emulate different processors, or with a software development board connected to a computer system.

FIG. 1 illustrates a conventional cross-platform development system 100 that includes a computer system 102 having processor emulation components. Computer system 102 includes a central processing unit 104, an operating system 106, and a cross-platform development application 108 that includes a processor emulator 110. Processor emulator 110 emulates a virtual processor inside of central processing unit 104, where the virtual processor is of a different type than processor 104.

The cross-platform development application 108 includes components or application tools, such as processor emulator 110, that enable software developers to configure, build, and debug new software applications and operating systems. With components of the cross-platform development application 108, a developer can design a new operating system, such as for a personal digital assistant or hand-held computing device, and include various features and device drivers. An image 112 of the new operating system can then be downloaded to processor emulator 110 that appears as an independent processor, but is actually a virtual processor.

A developer can utilize processor emulation for cross-platform development to view and debug a new software application or operating system in a window displayed on a display device 114 connected to, or integrated with, computer system 102. Additionally, a developer can debug the new software application or operating system with a keyboard 116 and mouse 118 connected to computer system 102. Cross-platform development with processor emulation is simplified because external hardware to run and test a new software application or operating system does not need to be connected to computer system 102. Additionally, existing peripheral input/output devices, such as display 114, keyboard 116, and mouse 118, connected to computer system 102, can be utilized to interact with the software application or operating system being developed.

Although cross-platform development with processor emulation is simplified for a developer, a virtual processor only emulates one type of processor and runs up to ten-times slower than an actual central processing unit. Processor emulation does not provide a realistic representation of how a new software application or operating system will perform when executed with the actual central processing unit that the virtual processor is emulating. Consequently, processor emulation is not reliable as a software debug tool for a final version of a product.

Cross-platform development of a new software application or operating system with a software development board is an alternative to processor emulation. A software development board can be configured with different processors from different manufacturers, and can be configured with many different hardware options and configurations. When a developer is first creating a new software application or operating system, hardware and processor components are unknown design variables because features of the new software application or operating system can influence which hardware and processor components are ultimately selected by the developer.

FIG. 2 illustrates a conventional cross-platform development system 200 that includes a computer system 202 connected to a software development board 204. Computer system 202 includes a central processing unit 206, an operating system 208, and a debug transport layer 210. The debug transport layer 210 is a connection interface for a physical connection 212 to software development board 204. Typically, transport layer 210 is implemented as an Ethernet debug transport, and physical connection 212 is an Ethernet connection.

Software development board 204 includes a central processing unit 214, a read only memory (ROM) 216, and a random access memory (RAM) 218. Conventional software development board 204 also includes a system of connections 220 for peripheral input/output devices, such as a keyboard input/output 222 for an external keyboard 224, a mouse input/output 226 for an external mouse 228, and a display input/output 230 for an external display device 232. Software development boards also typically include additional debug connectors, debug indicators such as LEDs, and expansion slots for variable hardware configurations. These additional components also add to the expense a software development board.

Software development board 204 maintains a bootloader application 234 in ROM 216. A bootloader 234 is the only software code that is maintained on software development board 204 when the board is first set up for testing. The bootloader 234 communicates with computer system 202 via physical connection 212, or simply waits to receive an operating system image from computer system 202.

When a developer configures and builds a new operating system, an image 236 of the new operating system is downloaded to RAM 218 on software development board 204 via the debug transport layer 210 and physical connection 212. When the operating system image 236 is downloaded and stored in RAM 218, bootloader 234 transfers execution of the software development board 204 to the new operating system which executes on central processing unit 214. The developer can debug with the new operating system with the keyboard 224, mouse 228, and display device 232 connected to the software development board 204.

Software development boards that are configurable for different processors and the many different possible hardware components and configurations are expensive and require considerable user setup before any new software application or operating system can be tested. Initial setup can be tedious because software development boards are designed to be configurable. For example, some boards are sold new without a ROM component, and some boards require setup and configuration of a data input/output EPROM program, binary files, dip switch settings, and other similar configuration requirements.

Additionally, software development boards are designed to use peripheral input/output devices, such as a keyboard, a mouse, and/or a display, that are connected directly to the boards for user interaction. The additional requirement of direct-connect peripheral input/output devices adds to the already expensive initial cost of a software development board.

SUMMARY

A cross-platform software development system includes a computing device that generates an image of an operating system, and a software development peripheral connected to the computing device that executes the operating system corresponding to the image. The software development peripheral communicates information, such as image data, generated by the operating system back to the computing device where the information is displayed on a display device connected to the computing device.

The computing device includes a cross-platform development component that recognizes a configuration identification of the software development peripheral when the software development peripheral is communicatively linked with the computing device via a debug transport. The cross-platform development component generates the image of the operating system corresponding to the configuration identification of the software development peripheral. The computing device also includes a virtual input/output system to communicate the information generated by the operating system between the computing device and virtual device drivers of the software development peripheral.

BRIEF DESCRIPTION OF THE DRAWINGS

The same numbers are used throughout the drawings to reference like features and components.

DETAILED DESCRIPTION

Introduction

The following describes systems and methods for a cross-platform development system that can be utilized to configure, build, and debug new software applications and operating systems. The cross-platform development system includes a software development peripheral that can also be utilized to test different central processing units from different manufacturers along with the with many different hardware options and configurations. For an operating system developer, the cross-platform development system provides an easy to use development resource, and also provides accurate and real-time operating system analysis.

Exemplary Cross-Platform Development Systems

Figure 1:
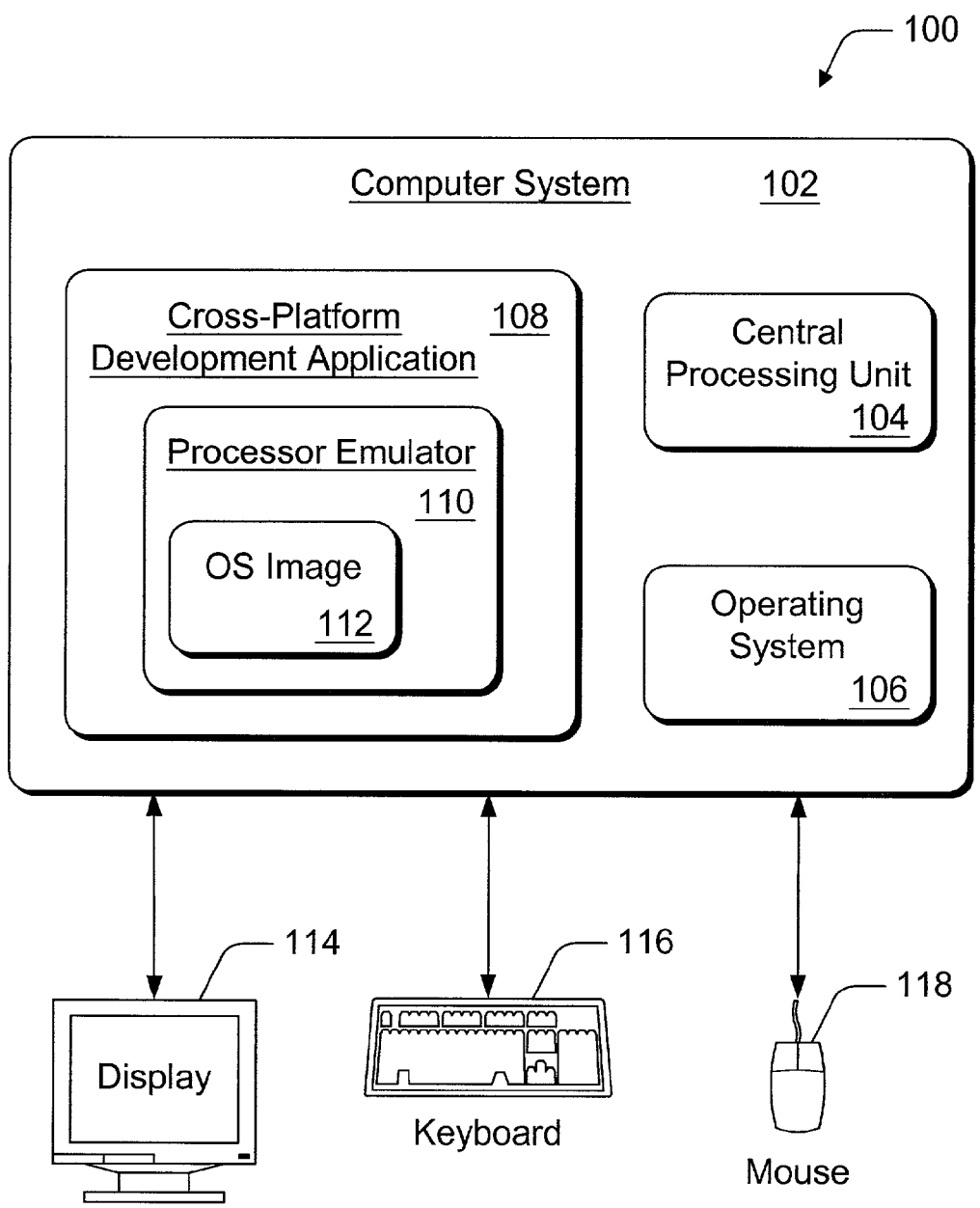
FIG. 1 illustrates a conventional cross-platform development system that includes a processor emulator.
Figure 2:
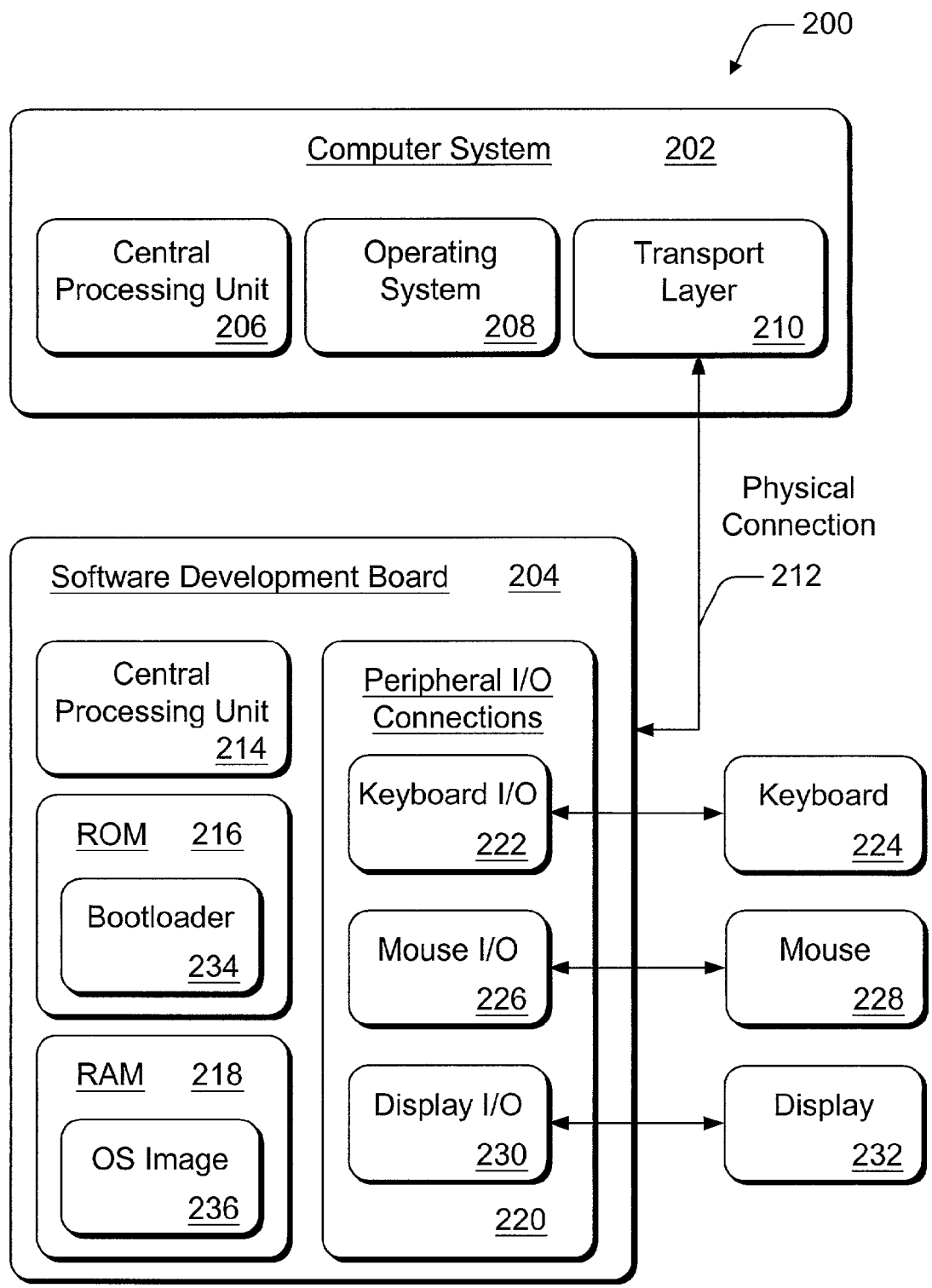
FIG. 2 illustrates a conventional cross-platform development system that includes a software development board.
Figure 3:
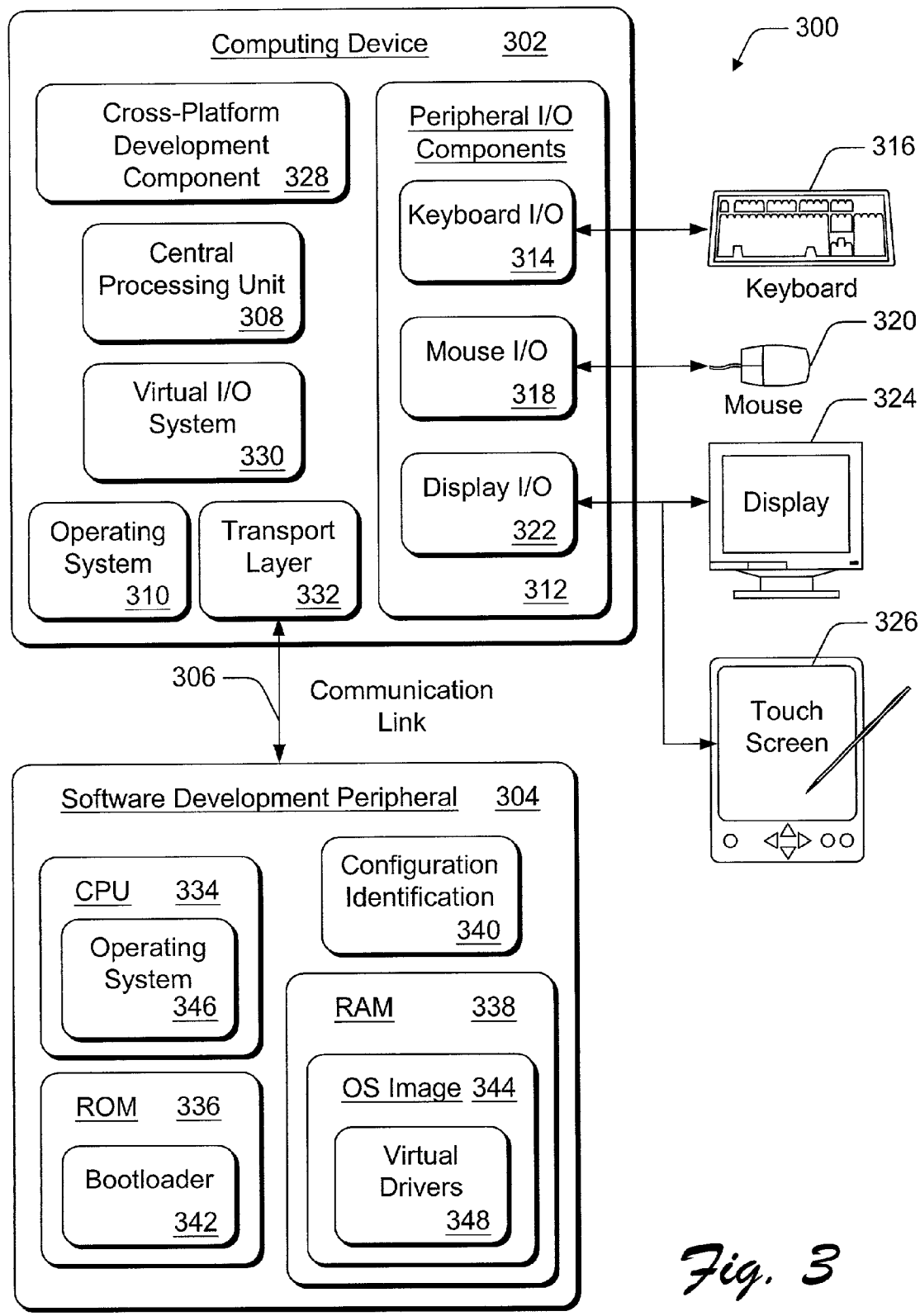
FIG. 3 illustrates an exemplary cross-platform development system with a software development peripheral.

FIG. 3 illustrates a cross-platform development system 300 having components that can be implemented within a computing device, or the components can be distributed within a computing system having more than one computing device. The cross-platform development system 300 includes a computing device 302 coupled with a software development peripheral 304 via a communication link 306. See the description of "Exemplary Computing System and Environment" below for specific examples and implementations of networks, computing systems, computing devices, and components that can be used to implement the invention described herein.

Computing device 302 includes a central processing unit 308, an operating system 310, and a system of peripheral input/output components 312, such as device drivers and connectors, to couple and support external input/output devices 11 for computing device 302. The peripheral input/output components 312 include a keyboard input/output 314 for an external keyboard 316, a mouse input/output 318 for an external mouse 320, and a display input/output 322 for an external display device 324 and/or external touch screen device 326.

Computing device 302 also includes a cross-platform development component 328, a virtual input/output system 330, and a debug transport layer 332. The debug transport layer 332 is a connection interface for the communication link 306 between computing device 302 and the software development peripheral 304. Communication link 306 can be implemented as a USB (universal serial bus), or Ethernet connection, for example.

Software development peripheral 304 includes a central processing unit 334, a read only memory (ROM) 336, a random access memory (RAM) 338, and a configuration identification component 340. The configuration identification component 340 can be an independent component of software development peripheral 304, or component 340 can be a software component and/or a unique identifier component stored in bootloader application 342 in ROM 336. The bootloader application 342 is the only software code that is maintained on the software development peripheral 304 when the peripheral device is first initialized. The bootloader application 342 communicates with computing device 302, or simply waits to receive an operating system image from computing device 302.

When a developer configures and builds a new operating system, an image 344 of the new operating system is downloaded to RAM 338 on software development peripheral 304 via the debug transport layer 332 and communication link 306. The operating system image 344 is a self contained binary file that contains embedded operating system 346 and associated components, such as virtual device drivers 348. When the operating system image 344 is downloaded and stored in RAM 338, bootloader 342 transfers execution of the software development peripheral 304 to the new operating system 346 which executes on central processing unit 334.

The software development peripheral 304 communicates information, such as debug information and image data, generated by operating system 346 to the virtual input/output system 330 at computing device 302 via communication link 306 and debug transport layer 332. Keyboard, mouse, and display information is remoted to computing device 302 with virtual device drivers 348 that are included as part of the operating system image 344 when the image is downloaded from computing device 302 to the software development peripheral 304. The virtual drivers 348 communicate input/output information and data to the computing device 302. For example, operating system 346 generates image data that is communicated to the virtual input/output system 330 at computing device 302 via a virtual display device driver 348, communication link 306, and debug transport layer 332 to display device 324.

The software development peripheral 304 is a resource that can be used as a development tool to develop software applications and operating systems for a particular platform that is different from the computing device 302 platform. From a developer's perspective, the software development peripheral 304 appears as a processor emulator in that it is easy to implement and interface with. A developer can debug and execute the new operating system 346 that is executing software development peripheral 304 with the keyboard 316, mouse 320, display device 324, and/or touch screen device 326 connected to computing device 302.

The virtual input/output system 330 is an application that runs on computing device 302 and is the interface component between computing device 302 and the virtual drivers 348 on the software development peripheral 304. The virtual input/output system 330 receives the information generated by operating system 346 from the virtual drivers 348. Additionally, the virtual input/output system 330 generates an associated virtual input/output display, such as a debugging window, on display device 324, or touch screen device 326. When a developer is interfacing with the software development peripheral system from the virtual input/output display window, all of the keyboard, mouse, display, and touch screen input/outputs are routed to and from the software development peripheral 304.

When a different window is selected on the computing device display 324, the focus of the input/outputs from the keyboard, mouse, display, and touch screen peripheral devices switches back to computing device 302. It is to be appreciated that a virtual input/output display can still be displayed in the background to display changes and updates generated by operating system 346 on software development peripheral 304.

The software development peripheral 304 facilitates operating system kernel level debugging and testing. That is, a kernel level debugging program stops the execution of an entire system running on software development board 304 and no threads are scheduled. Debugging at the kernel level requires the low level support features such as the bootloader 342, and a kernel-independent transport layer 332.

The software development peripheral 304 can be implemented as a recognizable plug-and-play device. The cross-platform development component 328 of computing device 302 recognizes the configuration identification 340 of the software development peripheral 304 when the software development peripheral is communicatively linked with computing device. The cross-platform development component 328 recognizes central processing unit 334 on the software development peripheral 304 as a pre-defined processor type, such as an Intel, Hitachi, Motorola, SHX, or other type of processor. When a developer configures and builds a new operating system, for example, the cross-platform development component 328 generates the operating system image 344 to include processor specific components, such as the virtual drivers 348. In a build environment, decisions about which drivers and other components to include with a new operating system 346 are automated by the cross-platform development component 328.

Figure 4:
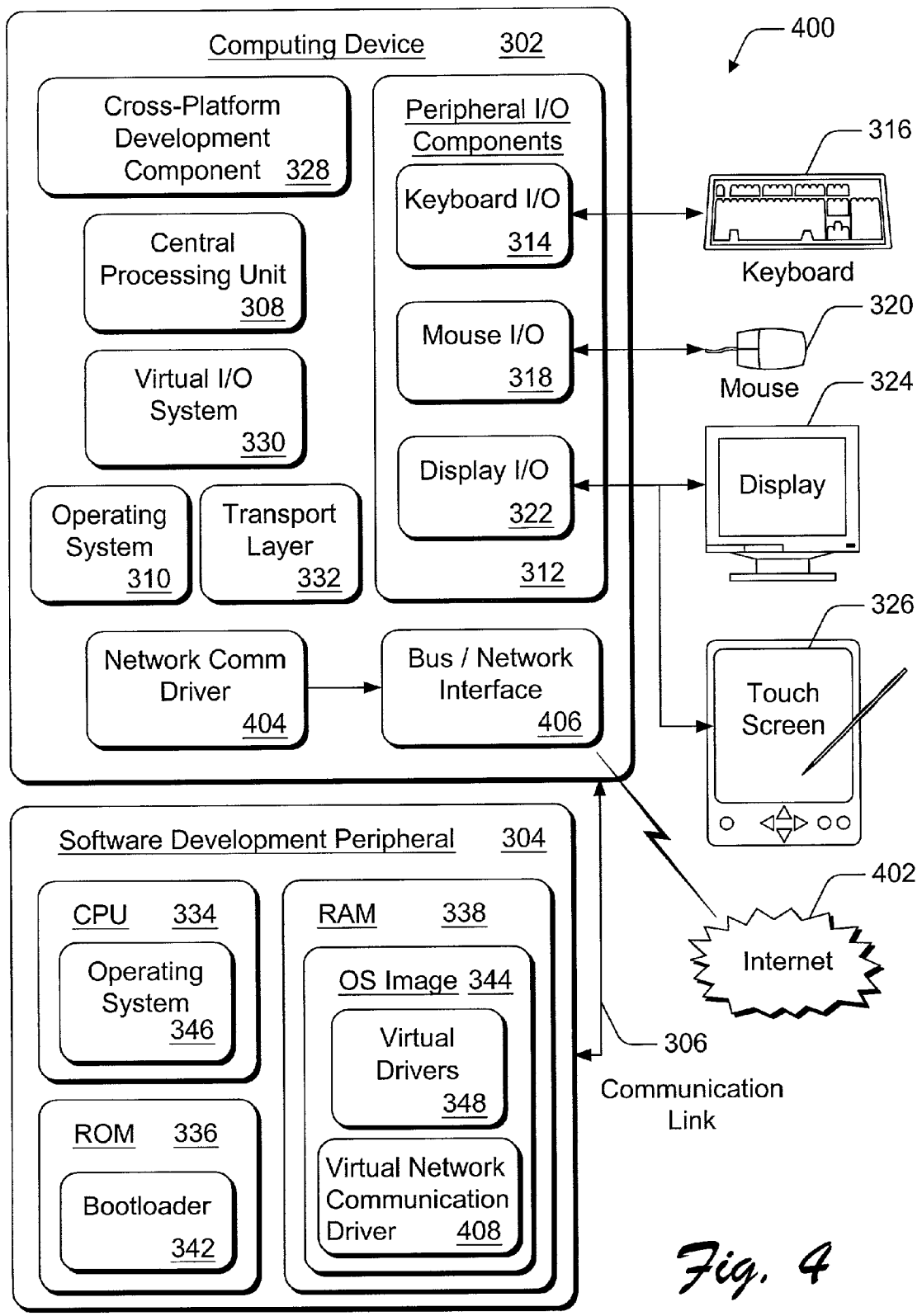
FIG. 4 illustrates the cross-platform development system shown in FIG. 3 with network communication components.

FIG. 4 illustrates a cross-platform development system 400 having network communication components to remote network connectivity, such as to the Internet 402. Computing device 302 includes a network communication driver 404 that communicates information with virtual input/output system 330 and communicates with a bus and/or network interface 408. The bus and/or network interface 408 communicates with the network 402.

The software development peripheral 304 includes a virtual network communication driver 408 that communicates information from software development peripheral 304 to the virtual input/output system 330 of computing device 302. Network connectivity information generated by operating system 346 on software development peripheral 304 is communicated from the virtual network communication driver 408 via communication link 306 and via the network communication components of computing device 302 to network 402.

Figure 5:
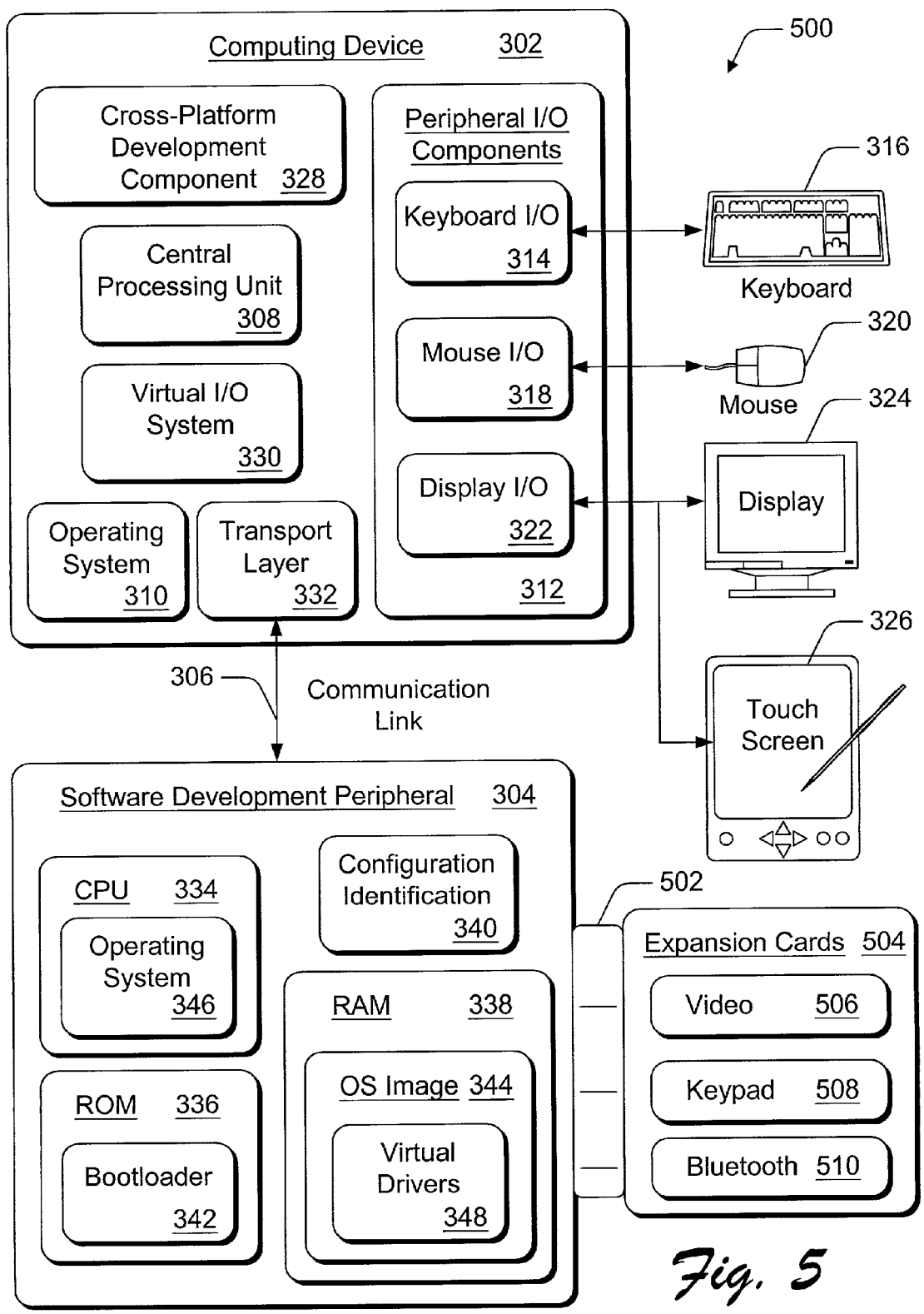
FIG. 5 illustrates the cross-platform development system shown in FIG. 3 with an expansion component to connect peripheral input/output components.

FIG. 5 illustrates a cross-platform development system 500 having an expansion component 502 to connect input/output devices to software development peripheral 304. External input/output devices and components are connected to the software development peripheral 304 via expansion cards 504. The expansion cards 504 connect components to test with new operating system 346 and/or with variations of central processing unit 334, such as a video or display device 506, a keypad input 508 such as for a cellular phone, a wireless input/output such as a Bluetooth component 510, and other input/output devices.

Method for Cross-Platform Development Systems

Figure 6:
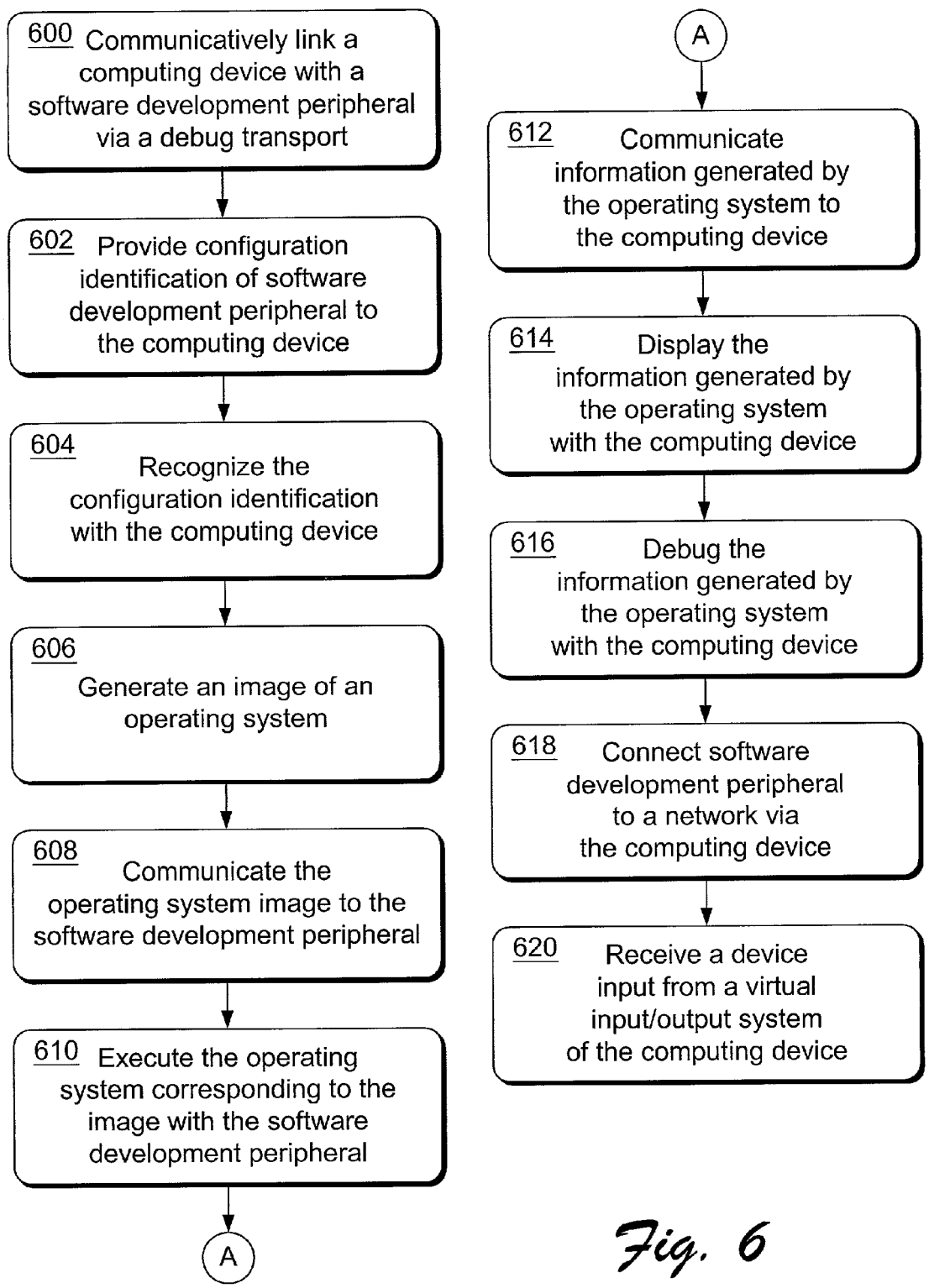
FIG. 6 is a flow diagram of a method for cross-platform development with a software development peripheral.

FIG. 6 illustrates a method for cross-platform development with a software development peripheral. The order in which the method is described is not intended to be construed as a limitation. Furthermore, the method can be implemented in any suitable hardware, software, firmware, or combination thereof.

At block 600, a computing device is communicatively linked with a software development peripheral via debug transport. At block 602, the software development peripheral provides a configuration identification to a cross-platform development component of the computing device. At block 604, the cross-platform development component of the computing device recognizes the configuration identification.

At block 606, an image of an operating system is generated. The image of the operating system can be generated with the cross-platform development component of the computing device, and the image can be generated to correspond to the configuration identification of the software development peripheral. At block 608, the image of the operating system is communicated to the software development peripheral.

At block 610, the operating system corresponding to the image is executed with the software development peripheral. At block 612, information generated by the operating system is communicated to the computing device. The information is communicated from the software development peripheral with a virtual device driver to a virtual input/output system of the computing device via the debug transport.

At block 614, the information generated by the operating system at the software development peripheral is displayed with the computing device. The information can include image data, for example, that is displayed with a display device connected to the computing device. At block 616, the information generated by the operating system is debugged with the cross-platform development component of the computing device.

At block 618, the software development peripheral is connected to a network via a network communication driver of the computing device. The network communication driver is communicatively linked with the network and with a virtual network communication driver of the software development peripheral.

At block 620, the software development peripheral receives a device input from a virtual input/output system of the computing device. The software development peripheral can receive a keyboard or pointing device input, for example, from the virtual input/output system of the computing device, where the keyboard or pointing device is connected to the computing device.

Exemplary Computing System and Environment

Figure 7:
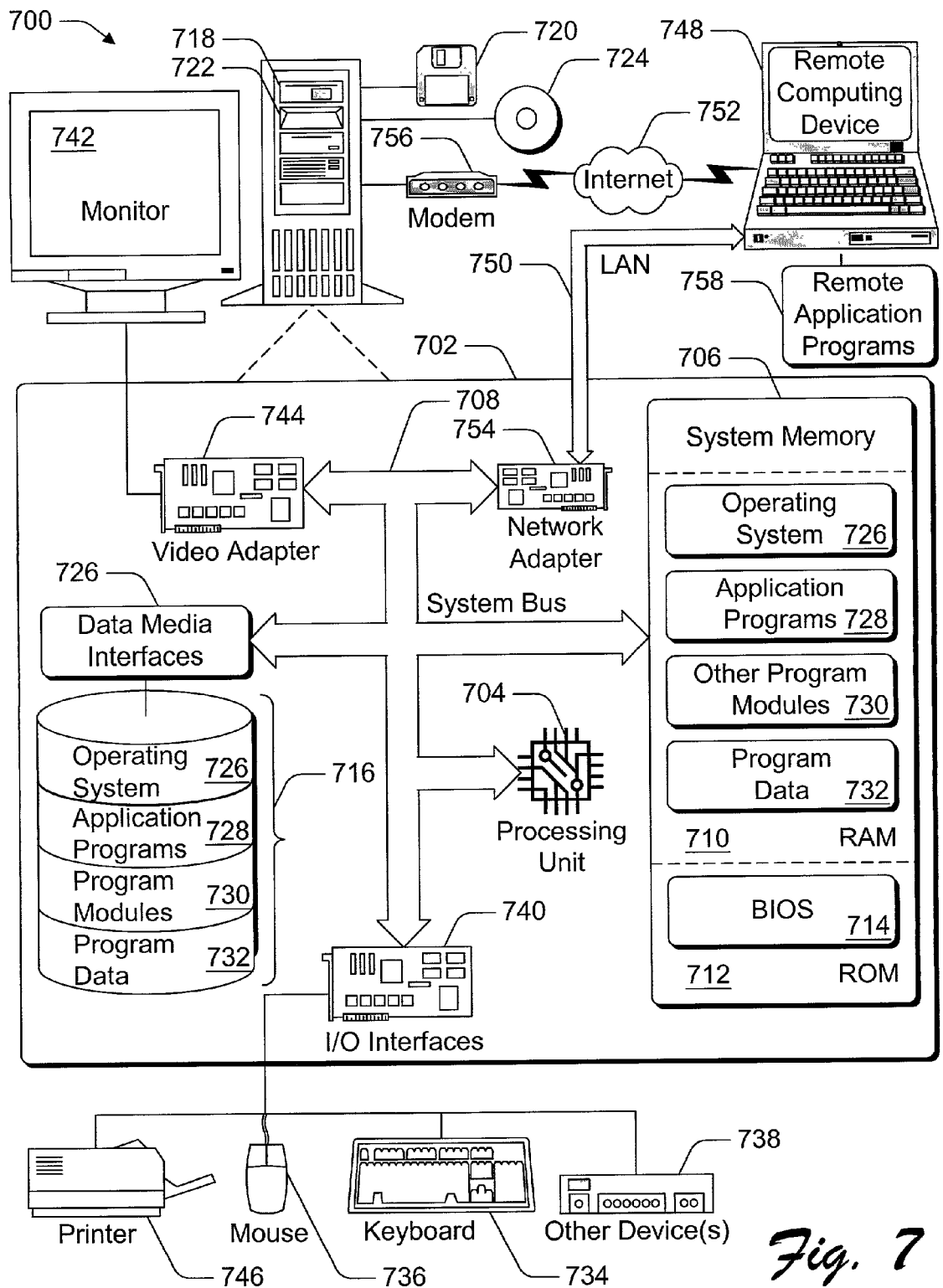
FIG. 7 is a diagram of computing systems, devices, and components in an environment that can be used to implement the invention described herein.

FIG. 7 illustrates an example of a computing environment 700 within which the computer, network, and system architectures described herein can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Methods for cross-platform development with a software development peripheral may be described in the general context of computer-executable instructions, such as program modules, being executed by a computer. Generally, program modules include routines, programs, objects, components, data structures, etc. that perform particular tasks or implement particular abstract data types. The systems and methods for cross-platform development with a software development peripheral may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing system in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 702 typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide nonvolatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of the systems and methods for cross-platform development with a software development peripheral.

Computer system 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

The illustrated and described systems and methods for cross-platform development with a software development peripheral is a resource that provides seamless operating system development from a desktop computing device while utilizing already available peripheral input/output devices such as a display device, touch screen, keyboard, mouse, and similar input/output devices connected to the desktop computing device. Development results for an operating system running on a software development peripheral can be remotely displayed onto a display device connected to the desktop computing device for easier development interface.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method, comprising:
   generating an image of an operating system with a host computing device;
   communicating the image of the operating system from the host computing device to a software development peripheral;
   executing the operating system corresponding to the image with the software development peripheral;
   communicating test information generated by the operating system corresponding to the image from the software development peripheral to the host computing device; and
   displaying the test information generated by the operating system at the host computing device.

2. A method as recited in claim 1, further comprising recognizing a configuration identification of the software development peripheral with a cross-platform development component of the host computing device when the software development peripheral is communicatively linked with the host computing device.

3. A method as recited in claim 1, wherein generating includes generating the image of the operating system with a cross-platform development component of the host computing device.

4. A method as recited in claim 1, further comprising recognizing a configuration identification of the software development peripheral with a cross-platform development component of the host computing device, and wherein generating includes generating the image of the operating system with the cross-platform development component, the image of the operating system corresponding to the configuration identification of the software development peripheral.

5. A method as recited in claim 1, further comprising debugging the test information generated by the operating system with a cross-platform development component of the host computing device.

6. A method as recited in claim 1, further comprising connecting the software development peripheral to a network via a network communication driver of the host computing device, the network communication driver communicatively linked with the network and with a virtual network communication driver of the software development peripheral.

7. A method as recited in claim 1, wherein communicating includes communicating the test information generated by the operating system to the host computing device via a debug transport.

8. A method as recited in claim 1, wherein communicating includes communicating the test information generated by the operating system to the host computing device with a virtual device driver of the software development peripheral.

9. A method as recited in claim 1, wherein communicating includes communicating image data generated by the operating system to a virtual input/output system of the host computing device with a virtual device driver of the software development peripheral.

10. A method as recited in claim 1, further comprising receiving a keyboard input wit the software development peripheral from a virtual input/output system of the host computing device, the keyboard input generated with a keyboard connected to the host computing device.

11. A method as recited in claim 1, further comprising receiving a pointing device input with the software development peripheral from a virtual input/output system of the host computing device, the pointing device input generated with a pointing device connected to the host computing device.

12. A system, comprising:
a host computing device configured to generate an image of an operating system; and
a software development peripheral configured to:
receive the image of the operating system from the host computing device;
execute the operating system corresponding to the image of the operating system; and
communicate test information generated by the operating system to the host computing device for display.

13. A system as recited in claim 12, wherein the host computing device includes a first type of processor to generate the image of the operating system, and wherein the software development peripheral is configured to execute the operating system on a second type of processor, the second type of processor being different than the first type of processor.

14. A system as recited in claim 12, wherein the host computing device is further configured to recognize the software development peripheral as a plug and play device when the software development peripheral is communicatively linked with the host computing device.

15. A system as recited in claim 12, wherein the host computing device includes a cross-platform development component configured to recognize a configuration identification of the software development peripheral when the software development peripheral is communicatively linked with the host computing device.

16. A system as recited in claim 12, wherein the host computing device includes a cross-platform development component configured to generate the image of the operating system.

17. A system as recited in claim 12, wherein the host computing device includes a cross-platform development component configured to recognize a configuration identification of the software development peripheral when the software development peripheral is communicatively linked with the host computing device, and wherein the cross-platform development component is further configured to generate the image of the operating system corresponding to the configuration identification of the software development peripheral.

18. A system as recited in claim 12, wherein the host computing device includes a cross-platform development component configured to debug the test information generated by the operating system.

19. A system as recited in claim 12, wherein the host computing device and the software development peripheral are communicatively linked via a debug transport.

20. A system as recited in claim 12, wherein the host computing device and the software development peripheral are communicatively linked via a universal serial bus connection.

21. A system as recited in claim 12, wherein the software development peripheral includes a virtual device driver configured to route the test information generated by the operating system to the host computing device, and wherein the host computing device includes a virtual input/output system configured to receive the test information generated by the operating system.

22. A system as recited in claim 12, wherein the host computing device includes a virtual input/output system configured to receive the test information generated by the operating system and route the test information to a display device.

23. A system as recited in claim 12, wherein the software development peripheral is further configured to communicate image data generated by the operating system to the host computing device via a virtual display device driver.

24. A system as recited in claim 12, wherein the software development peripheral is further configured to communicate image data generated by the operating system to the host computing device via a virtual display device driver, and wherein the host computing device includes a virtual input/output system configured to receive the image data and route the image data to a display device.

25. A system as recited in claim 12, wherein the software development peripheral is further configured to connect to a network via a network communication driver of the host computing device, the network communication driver communicatively linked with the network and with a virtual network communication driver of the software development peripheral.

26. A system as recited in claim 12, wherein the host computing device includes a virtual input/output system configured to route a keyboard input to the software development peripheral.

27. A system as recited in claim 12, wherein the host computing device includes a virtual input/output system configured to route a pointing device input to the software development peripheral.

* * * * *